United States Patent
Williams et al.

(10) Patent No.: US 10,769,582 B2
(45) Date of Patent: Sep. 8, 2020

(54) MULTIPLE CAMERA SYSTEM FOR INVENTORY TRACKING

(71) Applicant: Bossa Nova Robotics IP, Inc., Pittsburgh, PA (US)

(72) Inventors: Stephen Williams, Pittsburgh, PA (US); Juan Pablo Gonzalez, Pittsburgh, PA (US); Sarjoun Skaff, Pittsburgh, PA (US)

(73) Assignee: BOSSA NOVA ROBOTICS IP, INC., Pittsburgh, PA (US)

( * ) Notice: Subject to any disclaimer, the term of this patent is extended or adjusted under 35 U.S.C. 154(b) by 313 days.

(21) Appl. No.: 15/633,467

(22) Filed: Jun. 26, 2017

(65) Prior Publication Data

US 2018/0005176 A1   Jan. 4, 2018

Related U.S. Application Data

(60) Provisional application No. 62/357,124, filed on Jun. 30, 2016.

(51) Int. Cl.
| | |
|---|---|
| *G06Q 10/00* | (2012.01) |
| *G06Q 10/08* | (2012.01) |
| *G06K 9/20* | (2006.01) |
| *G06K 9/32* | (2006.01) |
| *G06K 9/46* | (2006.01) |
| *G06K 9/00* | (2006.01) |

(52) U.S. Cl.
CPC ....... *G06Q 10/087* (2013.01); *G06K 9/00771* (2013.01); *G06K 9/209* (2013.01); *G06K 9/3233* (2013.01); *G06K 9/46* (2013.01); *G06Q 10/08* (2013.01)

(58) Field of Classification Search
CPC ....... G06Q 10/00; G06Q 10/08; G06Q 10/087
USPC .......................................... 705/28
See application file for complete search history.

(56) References Cited

U.S. PATENT DOCUMENTS

| | | | | |
|---|---|---|---|---|
| 10,078,826 | B2* | 9/2018 | Morandi | G06Q 30/06 |
| 2008/0077511 | A1* | 3/2008 | Zimmerman | G06Q 10/00 705/28 |
| 2015/0109338 | A1* | 4/2015 | McKinnon | G06F 16/9535 345/633 |
| 2017/0286901 | A1* | 10/2017 | Skaff | G06K 9/3216 |

\* cited by examiner

*Primary Examiner* — Russell S Glass

(74) *Attorney, Agent, or Firm* — David R. Stevens; Stevens Law Group

(57) ABSTRACT

A camera system for inventory monitoring includes a movable base that supports multiple cameras. The multiple cameras are directed toward inventory to take a series of pictures along aisle of a retail store or warehouse. A processing module connected to the multiple cameras is used to stitch together the pictures, and along with depth information and product identification information, construct a real time or near real time inventory mapping of products positioned on aisle shelves. This information can be transferred to remote locations to simplify and speed product ordering, and assist in maintenance of appropriate product stock levels.

22 Claims, 6 Drawing Sheets

MULTIPLE CAMERA SYSTEM FOR INVENTORY TRACKING

RELATED APPLICATIONS

This application claims the benefit of U.S. Provisional Application Ser. No. 62/357,124 filed Jun. 30, 2016, which is hereby incorporated herein by reference in its entirety for all purposes.

TECHNICAL FIELD

The present disclosure relates generally to a multiple camera sensor suite capable of accurately monitoring retail or warehouse product inventory. In certain embodiments, the multiple camera sensor suite can include onboard processing to provide near real time product tracking and reduce data transfer requirements.

BACKGROUND

Retail stores or warehouses can have thousands of distinct products that are often sold, removed, added, or repositioned. Even with frequent restocking schedules, products assumed to be in stock may actually be out of stock, decreasing both sales and customer satisfaction. Point of sales data can be used to roughly estimate product availability, but does not help with identifying misplaced, stolen, or damaged products, all of which can reduce product availability. However, manually monitoring product inventory and tracking product position is expensive and time consuming.

One solution for tracking product inventory relies on machine vision technology. Machine vision can be used to assist in shelf space monitoring. For example, large numbers of fixed position cameras can be used throughout a store to monitor aisles, with large gaps in shelf space being flagged. Alternatively, a smaller number of movable cameras can be used to scan a store aisle. Even with such systems, human intervention is usually required to determine product identification number, product count, and to search for misplaced product inventory.

SUMMARY

A low cost, accurate, and scalable camera system for product or other inventory monitoring can include a movable base. Multiple cameras supported by the movable base are directable toward shelves or other systems for holding products or inventory. A processing module is connected to the multiple cameras and able to construct from the camera derived images an updateable map of product or inventory position. Because it can be updated in real or near real time, this map is known as a "realogram" to distinguish from conventional "planograms" that take the form of 3D models, cartoons, diagrams or lists that show how and where specific retail products and signage should be placed on shelves or displays. Realograms can be locally stored with a data storage module connected to the processing module. A communication module can be connected to the processing module to transfer realogram data to remote locations, including store servers or other supported camera systems, and additionally receive inventory information including planograms to aid in realogram construction. In addition to realogram mapping, this system can be used detect out of stock products, estimate depleted products, estimate amount of products including in stacked piles, estimate products heights, lengths and widths, build 3D models of products, determine products' positions and orientations, determine whether one or more products are in disorganized on-shelf presentation that requires corrective action such as facing or zoning operations, estimate freshness of products such as produce, estimate quality of products including packaging integrity, locate products, including at home locations, secondary locations, top stock, bottom stock, and in the backroom, detect a misplaced product event (also known as a plug), identify misplaced products, estimate or count the number of product facings, compare the number of product facings to the planogram, estimate label locations, detect label type, read label content, including product name, barcode, UPC code and pricing, detect missing labels, compare label locations to the planogram, compare product locations to the planogram, measure shelf height, shelf depth, shelf width and section width, recognize signage, detect promotional material, including displays, signage, and features and measure their bring up and down times, detect and recognize seasonal and promotional products and displays such as product islands and features, capture images of individual products and groups of products and fixtures such as entire aisles, shelf sections, specific products on an aisle, and product displays and islands, capture 360-degree and spherical views of the environment to be visualized in a virtual tour application allowing for virtual walk throughs, capture 3D images of the environment to be viewed in augmented or virtual reality, capture environmental conditions including ambient light levels, capture information about the environment including measuring space compliance with disability and safety standards and determining if light bulbs are off, provide a real-time video feed of the space to remote monitors, provide on-demand images and videos of specific locations, including in live or scheduled settings, and build a library of product images.

In one embodiment, the movable base can be a manually pushed or guidable cart. Alternatively, the movable base can be a tele-operated robot, or in preferred embodiments, an autonomous robot capable of guiding itself through a store or warehouse. Depending on size of the store or warehouse, multiple autonomous robots can be used. Aisles can be regularly inspected to create realograms, with aisles having high product movement being inspected more often.

To simplify image processing and provide accurate results, the multiple cameras are typically positioned a set distance from the shelves during the inspection process. The shelves can be lit with ambient lighting, or in some embodiments, by an array of LED or other directable light sources positioned near the cameras. The multiple cameras can be linearly mounted in vertical, horizontal, or other suitable orientation on a camera support. In some embodiments, to reduce costs, multiple cameras are fixedly mounted on a camera support. Such cameras can be arranged to point upward, downward, forward, backward, or level with respect to the camera support and the shelves. This advantageously permits a reduction in glare from products and shelving fixtures having highly reflective surfaces by orienting cameras out of the way of reflected light paths. In addition, multiple cameras with overlapping fields of view can result in at least one image with little or no glare.

In other embodiments, the cameras can include one or more movable cameras, zoom cameras, focusable cameras, wide-field cameras, infrared cameras, or other specialty cameras to aid in product identification or image construction, reduce power consumption and motion blur, and relax the requirement of positioning the cameras at a set distance from shelves. For example, a wide-field camera can be used to create a template into which data from higher resolution cameras with a narrow field of view are mapped. As another example, a tilt controllable, high resolution camera positioned on the camera support can be used to detect shelf labels and their content, including the price and product name, and decode their barcodes.

In another embodiment, an inventory monitoring method includes the steps of allowing an autonomous robot to move along an aisle that is lined with shelves capable of holding inventory or products, with the autonomous robot acting as a movable base for multiple cameras. Multiple cameras are directed toward inventory on the shelf lined aisle, with data derived at least in part from these cameras being used to construct a realogram of inventory using a processing module contained in the autonomous robot. Realogram data created by the processing module can be transferred to remote locations using a communication module, and inventory information received via the communication module can be used to aid in realogram construction.

In yet another embodiment, an inventory monitoring method, includes the steps of allowing an autonomous robot to move along a shelf lined aisle holding inventory, with the autonomous robot acting as a movable base for multiple cameras. The autonomous robot can maintain a substantially constant distance from the shelf lined aisle holding inventory while moving in a forward or reverse direction. Using the multiple cameras directed toward inventory on the shelf lined aisle, at least part of a realogram of inventory positioned along a shelf lined aisle holding inventory can be constructed. Typically, the realogram is created and updated with a locally sited data storage and a processing module contained in the autonomous robot. To ensure complete or near complete camera coverage of shelf lined aisles, the autonomous robot can pause, reverse, or mark for further multiple camera inspection if realogram creation for a portion of the shelf lined aisle is incomplete.

In still other embodiments, common issues associated with taking pictures from a moving base can be reduced by orientation of one or more of the multiple cameras in such a way as to take advantage of the rolling shutter effects and the direction of travel of the autonomous robot. In effect, aligning a camera in such a way as to take advantage of the "rasterized" delay of the rolling shutter reduces the artifacts (elongation/shortening) that could occur while the robot is traveling in its path.

DETAILED DESCRIPTION

Figure 1:
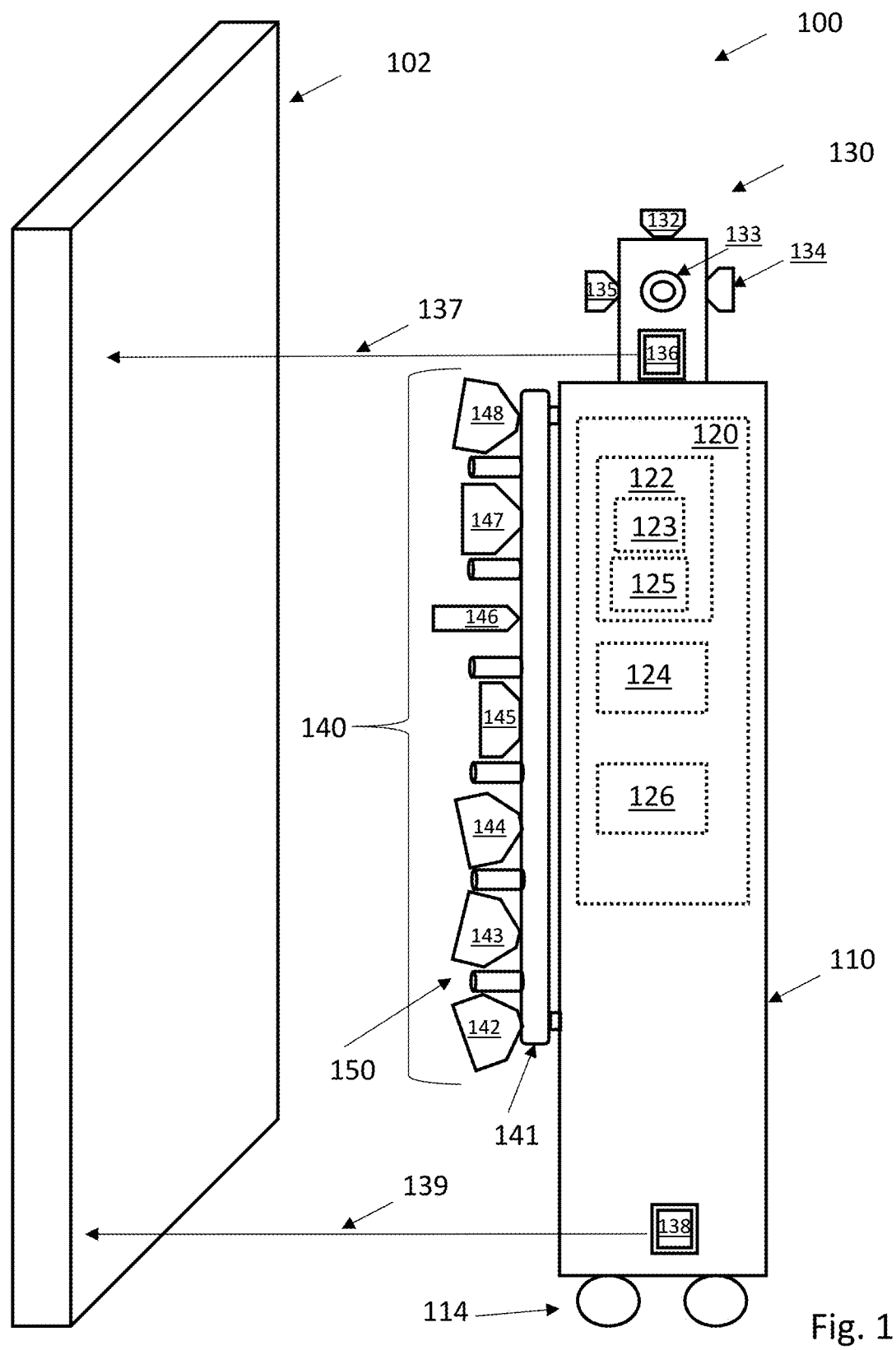
FIG. 1 is an illustration of a camera system mounted on a movable base to track product changes in aisle shelves or other suitable targets.

FIG. 1 is an illustration of an inventory monitoring camera system 100 mounted on a movable base 110 (with drive wheels 114) to track product changes in aisle shelves or other targets 102. The movable base 110 is an autonomous robot having a navigation and object sensing suite 130 that is capable of independently navigating and moving throughout a building. The autonomous robot has multiple cameras 140 attached to movable base 110 by a vertically extending camera support 140. Lights 150 are positioned to direct light toward target 102. The object sensing suite includes forward (133), side (134 and 135), top (132) and rear (not shown) image and depth sensors to aid in object detection, localization, and navigation. Additional sensors such as laser ranging units 136 and 138 (and respective laser scanning beams 137 and 139) also form a part of the sensor suite that is useful for accurate distance determination. In certain embodiments, image sensors can be depth sensors that infer depth from stereo images, project an infrared mesh overlay that allows rough determination of object distance in an image, or that infer depth from the time of flight of light reflecting off the target. In other embodiments, simple cameras and various image processing algorithms for identifying object position and location can be used. For selected applications, ultrasonic sensors, radar systems, magnetometers or the like can be used to aid in navigation. In still other embodiments, sensors capable of detecting electromagnetic, light, or other location beacons can be useful for precise positioning of the autonomous robot.

As seen in FIG. 1, various representative camera types useful for constructing an updateable realogram are shown. As previously noted, a realogram can use camera derived images to produce an updateable map of product or inventory position. Alternatively, camera derived images can provide other useful inventory related information such as out of stocks, low stock, label location and content, shelves height and depth, section boundaries, or other operations or marketing/sales relevant data that can be extracted, utilized, and potentially delivered as a service to customers. Typically, one or more shelf units (e.g. target 102) would be imaged by a diverse set of camera types, including downwardly (142 and 144) or upwardly (143 and 148) fixed focal length cameras that cover a defined field less than the whole of a target shelf unit; a wide field camera 145 to provide greater photographic coverage than the fixed focal length cameras; and a narrow field, zoomable telephoto 146 to capture bar codes, product identification numbers, and shelf labels. Alternatively, a high resolution, tilt controllable camera can be used to identify shelf labels. These camera 140 derived images can be stitched together, with products in the images identified, and position determined.

To simplify image processing and provide accurate results, the multiple cameras are typically positioned a set distance from the shelves during the inspection process. The shelves can be illuminated with LED or other directable lights 150 positioned on or near the cameras. The multiple cameras can be linearly mounted in vertical, horizontal, or other suitable orientation on a camera support. In some embodiments, to reduce costs, multiple cameras are fixedly mounted on a camera support. Such cameras can be arranged to point upward, downward, or level with respect to the camera support and the shelves. This advantageously permits a reduction in glare from products having highly reflective surfaces, since multiple cameras pointed in slightly different directions can result in at least one image with little or no glare.

Electronic control unit 120 contains an autonomous robot sensing and navigation control module 124 that manages robot responses. Robot position localization may utilize external markers and fiducials, or rely solely on localization information provided by robot-mounted sensors. Sensors for position determination include previously noted imaging, optical, ultrasonic sonar, radar, Lidar, Time of Flight, structured light, or other means of measuring distance between the robot and the environment, or incremental distance traveled by the mobile base, using techniques that include but are not limited to triangulation, visual flow, visual odometry and wheel odometry.

Electronic control unit 120 also provides image processing using a camera control and data processing module 122. Autonomous robot sensing and navigation control module 124 manages robot responses, and communication module 126 manages data input and output. The camera control and data processing module 122 can include a separate data storage module 123 (e.g. solid state hard drives) connected to a processing module 125. The communication module 126 is connected to the processing module 125 to transfer realogram data to remote locations, including store servers or other supported camera systems, and additionally receive inventory information to aid in realogram construction. In certain embodiments, realogram data is primarily stored and images are processed within the autonomous robot. Advantageously, this reduces data transfer requirements, and permits operation even when local or cloud servers are not available.

Figure 2:
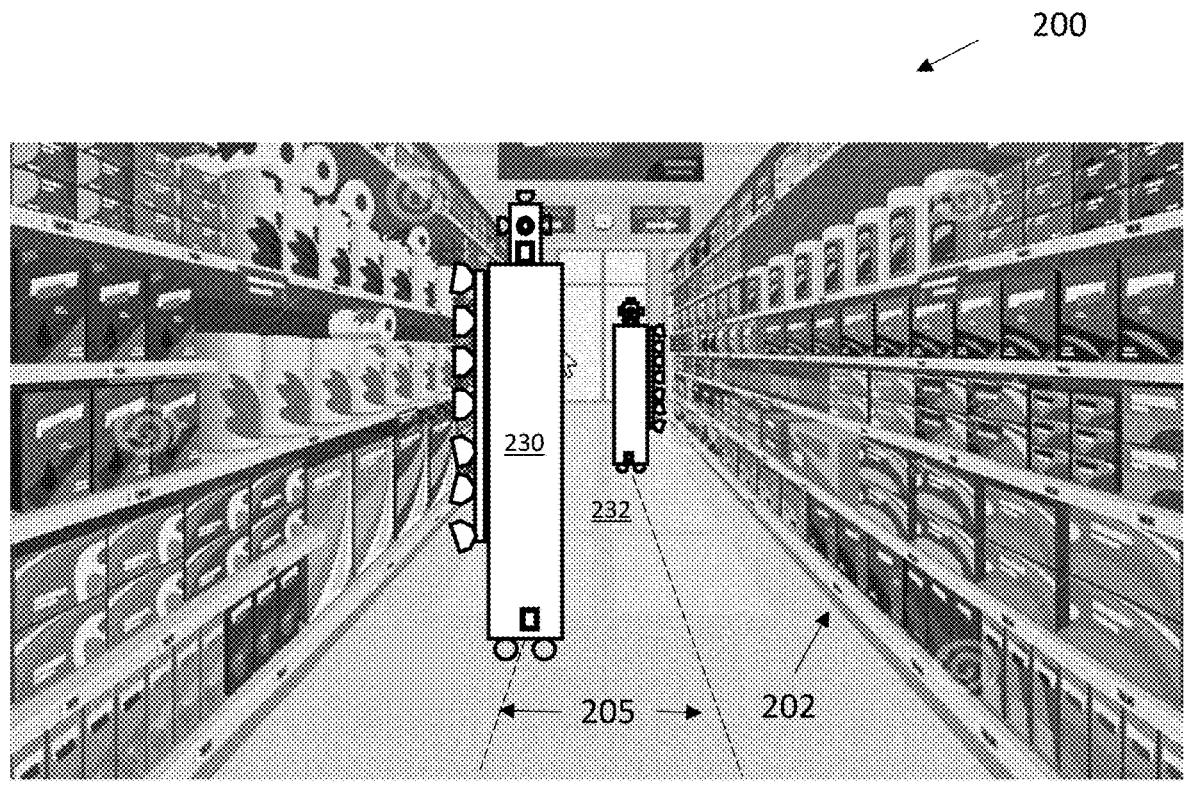
FIG. 2 is a cartoon illustrating two autonomous robots inspecting opposite shelves in an aisle.

FIG. 2 is a cartoon 200 illustrating two autonomous robots 230 and 232, similar to that discussed with respect to FIG. 1, inspecting opposite shelves 202 in an aisle. As shown each robot follows path 205 along the length of an aisle, with multiple cameras capturing images of the shelves 202.

In some embodiments, the robots 230 and 232 support at least one range finding sensor to measure distance between the multiple cameras and the shelves and products on shelves, with an accuracy of less than 5 cm, and with a typical accuracy range between about 5 cm and 1 mm. As will be appreciated, LIDAR or other instruments with sub-millimeter accuracy can also be used in selected applications. Using absolute location sensors, relative distance measurements to the shelves, triangulation to a known landmark, conventional simultaneous localization and mapping (SLAM) methodologies, or relying on beacons positioned at known locations in a blueprint or a previously built map, the robots 230 and 232 can move along a path generally parallel to a shelves 202. As the robots move, vertically positioned cameras are synchronized to simultaneously capture images of the shelves 202. In certain embodiments, a depth map of the shelves and products is created by measuring distances from the shelf cameras to the shelves and products over the length of the shelving unit using image depth sensors and or laser ranging instrumentation. Using available information, consecutive images can be stitched together to create a panorama that spans an entire shelving unit. The images can be first stitched vertically among all the cameras, and then horizontally and incrementally stitched with each new consecutive set of vertical images as the robots 230 and 232 move along an aisle.

Figure 3:
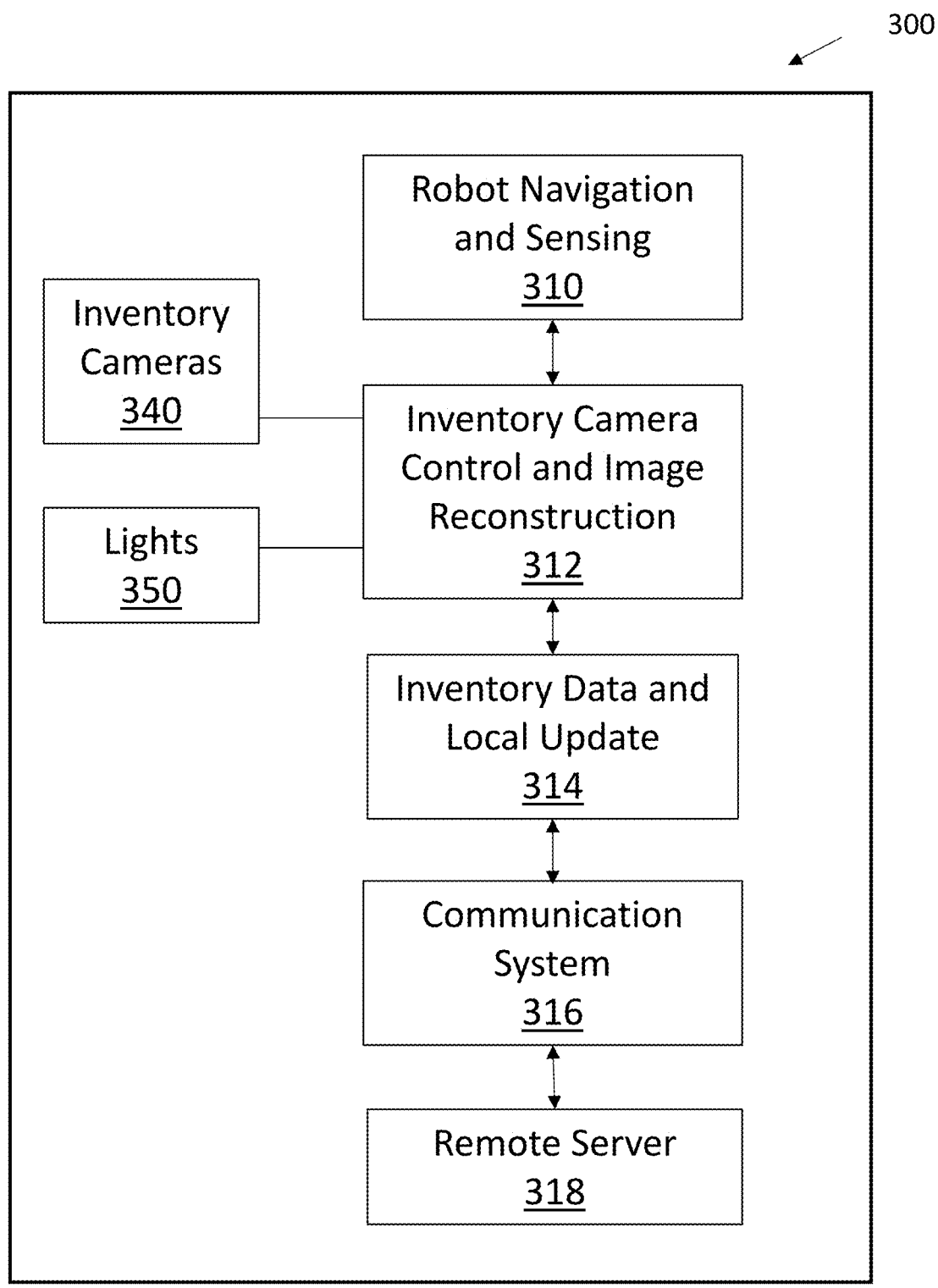
FIG. 3 is an illustration of various systems and electronic modules connected to inventory cameras.

FIG. 3 is an illustration of various systems and electronic modules 300 supported by an autonomous robot having robot navigation and sensing 310. Inventory cameras 340 are moved into a desired position with the aid of robot navigation and sensing module 310. Lights 350 are directed toward product inventory and inventory camera control and image reconstruction 312 takes a series of inventory photos (and optional depth measurements) that can be stitched together to help form or update a realogram. Realogram data is handled by an inventory data and local update module 314, which can transmit or receive realogram relevant information via communication system 316. Data can be communicated to a server local to the store, or transmitted by suitable internet or networking devices to remote company servers or cloud accessible data sites.

Inventory cameras 340 can include one or more movable cameras, zoom cameras, focusable cameras, wide-field cameras, infrared cameras, or other specialty cameras to aid in product identification or image construction. For example, a wide-field camera can be used to create an image organizing template into which data from higher resolution cameras with a narrow field of view are mapped. As another example, a tilt controllable, high resolution camera positioned on the camera support roughly at a height of a shelf lip can be used to read shelf attached bar codes, identifying numbers, or labels. In certain embodiments, conventional RGB CMOS or CCD sensors can be used, alone or in combination with spectral filters that may include narrowband, wideband, or polarization filters. Embodiments can also include sensors capable of detecting infrared, ultraviolet, or other wavelengths to allow for hyperspectral image processing. This can allow, for example, monitoring and tracking of markers, labels or guides that are not visible to people, or using flashing light in the invisible spectrum that do not induce discomfort of health risk while reducing energy consumption and motion blur.

Lights can may be mounted along with, or separately from, the sensors, and can include monochromatic or near monochromatic light sources such as lasers, light emitting diodes (LEDs), or organic light emitting diodes (OLEDs). Broadband light sources may be provided by multiple LEDs of varying wavelength (including infrared or ultraviolet LEDs), halogen lamps or other suitable conventional light source. Various spectral filters that may include narrowband, wideband, or polarization filters and light shields, lenses, mirrors, reflective surfaces, diffusers, concentrators, or other optics can provide wide light beams for area illumination or tightly focused beams for improved local illumination intensity.

According to some embodiments, both cameras 340 and lights 350 can be movably mounted. For example, hinged, rail, electromagnetic piston, or other suitable actuating mechanisms used to rotate, elevate, depress, oscillate, or laterally or vertically reposition cameras or lights.

In still other embodiments, one or more of the cameras can be mounted in such a way as to take advantage of the rolling shutter effects and direction of travel of the autonomous robot. Aligning a camera in such a way as to take advantage of the "rasterized" delay of the rolling shutter can reduce artifacts (elongation/shortening) that can occur while the robot is traveling in its path.

Inventory data 314 can include but is not limited to an inventory database capable of storing data on a plurality of products, each product associated with a product type, product dimensions, a product 3D model, a product image and a current product shelf inventory count and number of facings. Realograms captured and created at different times can be stored, and data analysis used to improve estimates of product availability. In certain embodiments, frequency of realogram creation can be increased or reduced, and changes to robot navigation being determined.

The communication system 316 can include connections to both a wired or wireless connect subsystem for interaction with devices such as servers, desktop computers, laptops, tablets, or smart phones. Data and control signals can be received, generated, or transported between varieties of external data sources, including wireless networks, personal area networks, cellular networks, the Internet, or cloud mediated data sources. In addition, sources of local data (e.g. a hard drive, solid state drive, flash memory, or any other suitable memory, including dynamic memory, such as SRAM or DRAM) that can allow for local data storage of user-specified preferences or protocols. In one particular embodiment, multiple communication systems can be provided. For example, a direct Wi-Fi connection (802.11b/g/n) can be used as well as a separate 4G cellular connection.

Remote server 318 can include, but is not limited to servers, desktop computers, laptops, tablets, or smart phones. Remote server embodiments may also be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 4:
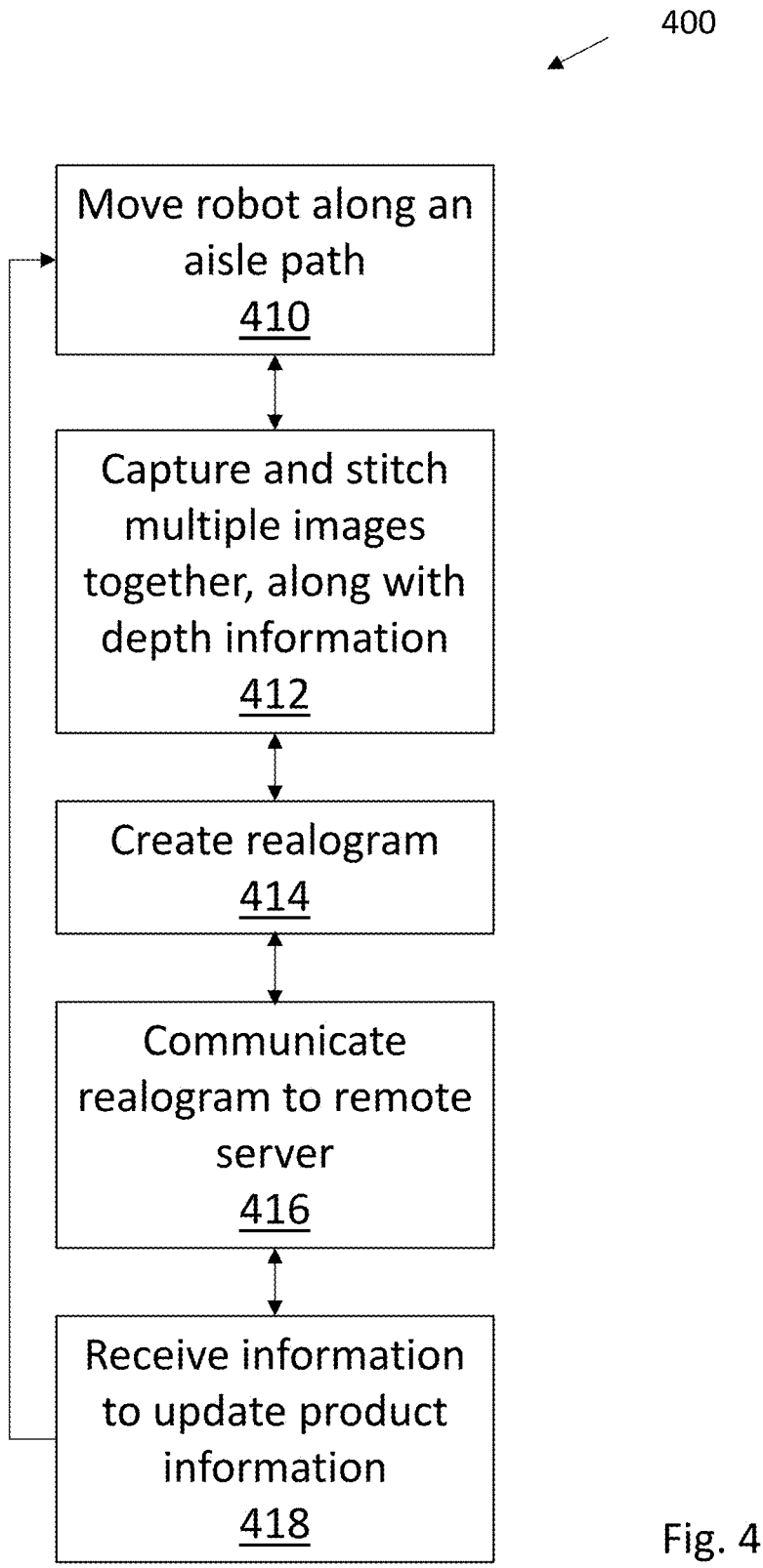
FIG. 4 is an illustration of steps in one embodiment of operation.

FIG. 4 is an illustration of realogram updating steps in one embodiment of operation. As seen in flow chart 400, a robot moves to an identified position and proceeds along an aisle path at a predetermined distance (step 410). If the path is blocked by people or objects, the robot can wait till the path is unobstructed, begin movement and slow down or wait as it nears the obstruction, move along the path until required to divert around the object before reacquiring the path, or simply select an alternative aisle.

In step 412, multiple images are captured and stitched together. These stitched images, along with depth information created by distance ranging systems (including but not limited to LIDAR or time-of-flight systems), an infrared depth sensor, ultrasonic, systems that infer depth from stereo images, or systems that project an infrared mesh overlay that allows rough determination of object distance in an image, or other suitable system capable of distinguishing depth at a about a ten centimeter or less scale (including, but not limited to centimeter scale, sub-centimeter scale, or millimeter scale), are used to create a realogram (step 414). The realogram use shelf labels, bar codes, and product identification databases to identify products, localize product placement, estimate product count, count the number of product facings, or even identify or locate missing product. This information is communicated to a remote server (step 416) for use by, for example, store managers, stocking employees, or customer assistant representatives. Additionally, in realogram or other information received from other robots, from updated product databases, or from other stores can be used to update or assist in creation of subsequent realograms (step 418).

Typically, stitched or original images are segmented, and the segmented images are used to help define a product bounding box that putatively identifies a product facing. This information is often necessary to develop a product library. A segmented image can include multiple product bounding boxes, typically ranging from dozens to hundreds of outlined or distinct image areas. The bounding boxes can surround either product facings, groups of products, or gaps between products.

In one embodiment, the product bounding box, with suitable identifiers, can be registered to a simple or panoramic stitched image of the shelf, and image descriptors extracted for the portion of the image contained in the bounding box. Methods for generating image descriptors include but are not limited to: image templates, Histogram of Gradients, Histogram of Colors, the Scale Invariant Feature Transform, Binary Robust Independent Elementary Features, Maximally Stable Extremal Regions, Binary Robust Invariant Scalable Keypoints, Fast Retina Keypoints, Kaze features, and variations thereof.

An alternative to extracting product descriptors is to use the bounding boxes as labeled categories and train classifiers on the images contained in the bounding boxes. Classifiers may include those based on deep structured learning, hierarchical learning, deep machine learning, or other suitable deep learning algorithms associated with convolutional, feedforward, recurrent, or other suitable neural network. A deep learning based classifier can automatically learn image descriptors based on an annotated training data. For example, deep learning based image descriptors can be hierarchical, corresponding to multiple layers in deep convolutional neural networks. The final layer of a convolutional layer network outputs the confidence values of the product being in one of the designated image categories. The image descriptor generator part and the classification part get integrated in a convolutional neural network and these two parts are trained together using a training set.

Alternatively, or in addition, embodiments that use both deep learning based image descriptors and conventional image descriptors can be combined in a hybrid system.

In still other embodiments, the image descriptors can be classified and labelled with the identifier. Classification algorithms that can include but are not limited to support vector machine. This process can be repeated for every image of the bounding box associated to the same identifier, whether the image is captured in the same store at different times, or in different stores. In time, this allows automatically building a product library (i.e. the "Library of Products"), without requiring an initial planogram or storage of specific product databases.

In one embodiment, products within product bounding boxes can be manually identified, identified using crowd source or paid reviewer image identification systems, identified with or without the aid of an initial planogram or realogram, or automatically identified using various image classifiers discussed herein. Gaps between products are useful for identifying shelf spacings, product separation, or missing/absent inventory.

Automatic identification can be performed using an autonomous robot, alone or in combination with an external image classifier system. In certain embodiments, a product bounding box can be defined as the horizontal space on the shelf occupied by one or more copies (facings) of the same product, along with the vertical space spanning the distance between a current shelf and the shelf above it. When the current shelf is the top shelf, the vertical space is a number generally corresponding to the distance to top of the fixture. The vertical space can alternatively be top of the product as sensed by depth sensors.

Image segmentation to automatically assist in creation of product bounding boxes and product identification can rely on use of image templates in some embodiments. Typically, each image template is compared with the image captured by a camera system mounted on an autonomous robot. If a match is positive, the matched section of the image is used as the image segmentation for that product. In other embodiments, image segmentation can be supported by machine learning systems, including but not limited to deep learning methods.

As will be appreciated, other aspects of realogram development can also be supported by a wide range of automated, semi-automated, or manually provided classifiers. Classification algorithms such as convolution neural networks or other deep learning methods, template matching or HAAR cascades can be used to aid in detection of each shelf label. Each shelf label is analyzed to obtain one or more product identifiers. Analysis may include but is not limited to optical character recognition, bar code scanning, QR code scanning, AR code scanning, or hologram code scanning. Product identifiers may be UPC code, the product name, or a coded collection of letters, numbers, or other symbols. If more than one identifier is available, a preferred identifier such as the UPC code can be selected. In certain embodiments, infrared or ultraviolet detectable product identifiers embedded on product packaging or shelf labels can be used, as well as any other suitable tag, marker, or detectable identifying indicia such as a visible UPC code or serial number on the product packaging.

Figures 5A, 5B:
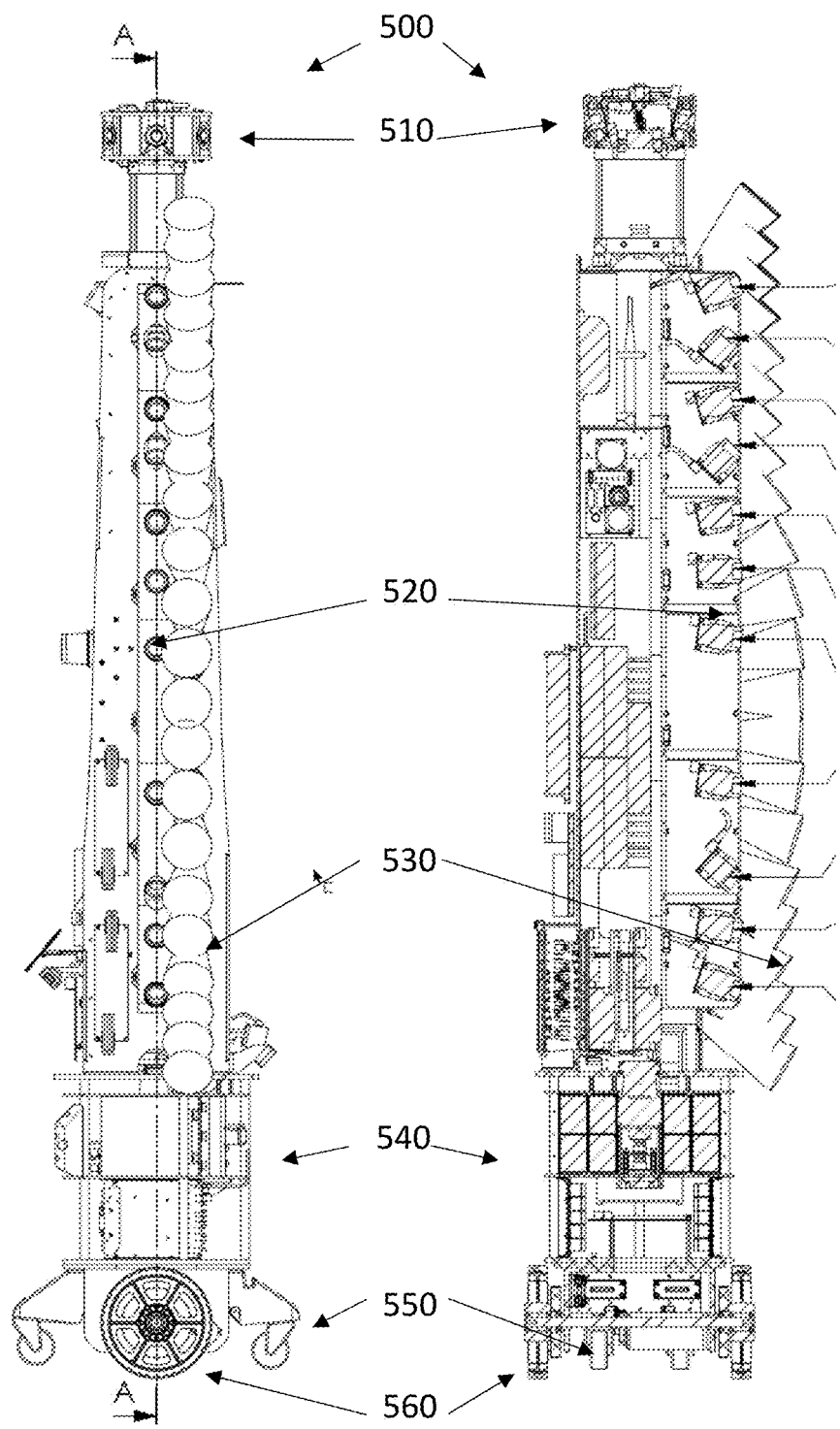
FIGS. 5A and B are respectively examples in side view and cross section of an autonomous robot capable of acting as a mobile base for a camera system.

If a product library is created or made available, the library can be searched for realogram related information. For example, products objects with a large number of similar features can be used to assist in developing the product bounding box. For each potential product object match, the geometric consistency of the feature locations in the library can be compared with the features in a shelf image. Some methods further include indexing the sets of descriptors within the library for improved searching performance and/or reduced storage requirements. Indexing methods include but are not limited to: hashing techniques, tree representations, and bag-of-words encodings. Alternatively, planograms, realograms, other product information, or product location information from the product library can be used to reduce the number of products that must be searched to just those products contained within the imaged shelf. In still other variations, identified products can be verified by segmenting and decoding the price tag or product label located proximally to each identified product and comparing it to the product object identifier. FIGS. 5A and B are respectively examples in side view and cross section of an autonomous robot 500 capable of acting as a mobile base for a camera system in accordance with this disclosure. The robot navigation and sensing unit includes a top mount sensor module 510 with a number of forward, side, rear, and top mounted cameras. A vertically aligned array of lights 520 is sited next to a vertically arranged line of cameras 530, and both are supported by a drive base 540 that includes control electronics, power, and docking interconnects. Mobility is provided by drive wheels 560, and stability is improved by caster wheels 550.

Figure 6:
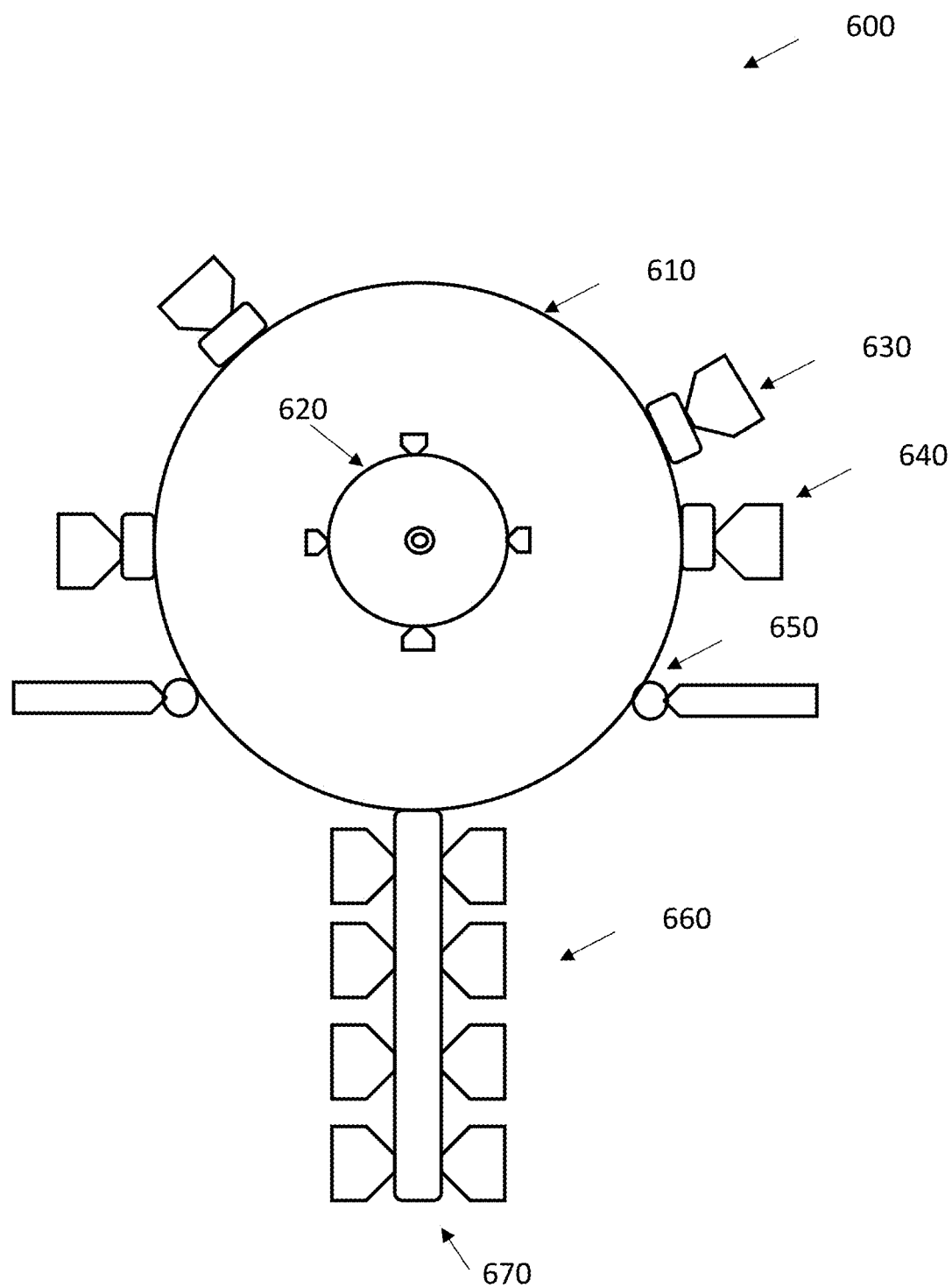
FIG. 6 is a top view, looking down, of various possible camera support sites on a mobile base.

FIG. 6 is a top view, looking down, of camera platform 600 with various possible camera support sites situated on a mobile base 610. The mobile base 610 has a top mounted camera and sensor suite 620 (optionally viewing over 360 degrees) to aid in positioning and navigating the mobile base 610 with respect to shelves in a retail store or warehouse aisle, and to capture 360-deg or spherical images of the environment. Fixedly mounted cameras 630 and 640 can be positioned to point at a perpendicular angle with respect to mobile base motion (640) or slightly angle forward (630). In certain embodiments, a controllable gimble or tilt mount (650) can be used to point a camera in a desired direction. In other embodiments, a boom 670, horizontally extending from the mobile base 610, can be used to support multiple linearly extending cameras that are directed to simultaneously capture images from each side of an aisle. In another embodiment, high-resolution cameras can be directed to point to one side of the aisle to read barcodes and identify labels, and low-resolution cameras are pointed toward the other side of the aisle. In this embodiment, the low-resolution cameras simply detect labels and match them to previously identified labels. When the robot navigates back along an aisle, the respective high resolution and low-resolution cameras supported by the robot can scan opposite sides. In still other embodiments, two-dimensional arrays of cameras or 360 degree cameras mounted at various positions on the mobile base 610 or camera platform 600 can be used.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A robotic camera system for inventory monitoring, comprising:
   a movable base;
   multiple cameras supported by the movable base, the multiple cameras being directable toward inventory;
   a processing module connected to the multiple cameras and able to construct inventory related information, the processing module configured to:
      stitch together consecutive images from the multiple cameras into a panorama,
      segment the panorama to define a plurality of bounding boxes,
      classify the plurality of bounding boxes into different categories,
      associate bounding boxes among different categories based on geographic position of the plurality of bounding boxes, and
      determine the inventory-related information based on the association of the bounding boxes;
   a communication module connected to the processing module to transfer the inventory related information to remote locations; and
   a navigation module connected with the movable base, the communication module, and the multiple cameras to direct the position and orientation of the robotic camera system.

2. The camera system of claim 1, wherein the processing module being further configured to create an updateable realogram from the associated bounding boxes.

3. The camera system of claim 1, wherein the movable base further comprises an autonomous robot.

4. The camera system of claim 1, wherein the multiple cameras are linearly mounted on a camera support.

5. The camera system of claim 1, wherein at least one of the multiple cameras is fixedly mounted on a camera support.

6. The camera system of claim 1, wherein at least one of the multiple cameras is a zoom camera.

7. The camera system of claim 1, wherein at least one of the multiple cameras is directed downward and at least one of the multiple cameras is directed upward.

8. The camera system of claim 1, further comprising a plurality of lights directable toward inventory.

9. The camera system of claim 1, wherein the multiple cameras include at least one of a wide field camera, a fixed camera, and a movable camera having a resolution sufficient to read shelf attached inventory information.

10. The camera system of claim 1, wherein the multiple cameras include an infrared camera.

11. An inventory monitoring method, comprising the steps of:
allowing an autonomous robot to move along a shelf lined aisle holding inventory, with the autonomous robot acting as a movable base for multiple cameras;
directing the multiple cameras toward inventory and shelf labels on the shelf lined aisle;
stitching together consecutive images from the multiple cameras into a panorama;
segmenting the panorama to define a plurality of bounding boxes;
classifying the plurality of bounding boxes into different categories comprising shelf labels, inventory labels, and inventory;
associating bounding boxes among different categories based on geographic position of the plurality of bounding boxes;
determining inventory-related information based on the associations of the bounding boxes; and
transferring the inventory-related information to remote locations using a communication module.

12. An inventory monitoring method, comprising the steps of:
allowing an autonomous robot to move along a shelf lined aisle holding inventory, with the autonomous robot acting as a movable base for multiple cameras;
maintaining a substantially constant distance from the shelf lined aisle holding inventory while moving in a forward direction;
directing the multiple cameras toward inventory on the shelf lined aisle;
generating a panorama from images captured by the multiple cameras;
segmenting the panorama to define a plurality of bounding boxes;
classifying the plurality of bounding boxes into categories comprising shelf labels, inventory labels, and inventory;
associating bounding boxes among different categories based on the geographic position of the bounding boxes; and
determining inventory-related information based on the association of bounding boxes.

13. The camera system of claim 12, wherein the multiple cameras are linearly mounted on a camera support.

14. The camera system of claim 12, wherein at least one of the multiple cameras is fixedly mounted on a camera support.

15. An inventory monitoring method, comprising the steps of:
allowing an autonomous robot to move along a shelf lined aisle holding inventory, with the autonomous robot acting as a movable base for multiple cameras;
directing the multiple cameras toward inventory on a shelf of the shelf lined aisle;
detecting distance from at least one of the multiple cameras to the shelf using a distance ranging system;
determining inventory related-information from camera images, including:
generating a panorama of the shelf by stitching consecutive images captured by the multiple cameras;
segmenting the panorama to define a plurality of bounding boxes;
classifying the plurality of bounding boxes into categories comprising shelf labels, inventory labels, and inventory;
associating bounding boxes among different categories based on the geographic location of the plurality of bounding boxes; and
determining the inventory-related information based on the associated of the bounding boxes; and
inferring real time inventory status of the shelf from the inventory-related information, including at least one of: integrity of a product location or on-shelf stock status of a product.

16. The inventory monitoring method of claim 15, wherein generating a panorama of the shelf comprises generating an updateable realogram of the shelf; and
wherein segmenting the panorama to define a plurality of bounding boxes comprises segmenting the panorama using one of: machine learning or deep learning.

17. The inventory monitoring method of claim 15, further comprising using the distance ranging system to capture a depth map.

18. The inventory monitoring method of claim 15, further comprising using the distance ranging system to capture a depth map including both shelves and products positioned on shelves.

19. The inventory monitoring method of claim 15, further comprising building a product library.

20. The inventory monitoring method of claim 15, further comprising building a product library using manual input to identify potential inventory designated in the multiple bounding boxes in the image taken with at least one camera.

21. The inventory monitoring method of claim 15, wherein the bounding boxes can surround gaps between potential inventory.

22. The inventory monitoring method of claim 15, further comprising building the product library without use of an initial planogram.

* * * * *